(12) United States Patent
Straub (10) Patent No.: US 9,662,703 B2
(45) Date of Patent: May 30, 2017

(54) METHOD AND DEVICE FOR PRODUCING A CLINCH-RIVET CONNECTION BY MEANS OF A ROTARY OSCILLATING MOVEMENT

(71) Applicant: WEBO Werkzeugbau Oberschwaben GmbH

(72) Inventor: Anton Straub, Fronreute/Blitzenreute (DE)

(73) Assignee: WEBO WERKZEUGBAU OBERSCHWABEN GMBH, Amtzell (DE)

( * ) Notice: Subject to any disclaimer, the term of this patent is extended or adjusted under 35 U.S.C. 154(b) by 216 days.

(21) Appl. No.: 14/221,565

(22) Filed: Mar. 21, 2014

(65) Prior Publication Data

US 2014/0283362 A1    Sep. 25, 2014

(30) Foreign Application Priority Data

Mar. 22, 2013    (DE) .......................... 10 2013 004 960

(51) Int. Cl.
*B23P 11/00*    (2006.01)
*B21D 39/03*    (2006.01)
(Continued)

(52) U.S. Cl.
CPC ............ *B21D 39/031* (2013.01); *B21K 25/00* (2013.01); *B23P 11/005* (2013.01); *F16D 1/072* (2013.01);
(Continued)

(58) Field of Classification Search
CPC ...... F16D 2250/00; F16D 1/072; F16D 1/101; F16D 2300/12; F16D 2300/26;
(Continued)

(56) References Cited

FOREIGN PATENT DOCUMENTS

DE        3723822 A1     1/1989
DE    102011011438 A1 *  8/2012   ........... B21D 39/032
(Continued)

OTHER PUBLICATIONS

European search report dated Mar. 31, 2015, in corresponding appl. No. 14000816.0.

*Primary Examiner* — Sarang Afzali
*Assistant Examiner* — Ruth G Hidalgo-Hernandez
(74) *Attorney, Agent, or Firm* — Browdy and Neimark, PLLC (57) ABSTRACT

A method is provided for producing a clinch-rivet connection using a rotary oscillating movement for connecting two metal components, wherein via the oscillating movement by means of forming rollers, a vertical, and simultaneously, a horizontal deformation is carried out, wherein one of the components has a preformed, flat, tab-like arc web, and the second component is provided with an at least partially V-shaped arc slot, which allows the accommodation of the preformed, flat, tab-like arc web, and via radial oscillating movement, the forming roller presses the arc web into the arced slot by superimposed axial movement, wherein the outer circumference of the forming rollers is provided with a wedge-shaped profile, and the oscillating movement of each forming roller with a specific pendulum path across the arc web does not exceed the length of the arc web.

18 Claims, 7 Drawing Sheets

(51) Int. Cl.
*B21K 25/00* (2006.01)
*F16D 1/072* (2006.01)
*F16H 57/08* (2006.01)

(52) U.S. Cl.
CPC ...... *F16D 2300/12* (2013.01); *F16D 2300/26* (2013.01); *F16H 57/082* (2013.01); *Y10T 29/49943* (2015.01); *Y10T 29/5377* (2015.01)

(58) Field of Classification Search
CPC . B21J 15/02; B21J 15/12; B21J 15/14; B21K 25/00; F16B 5/045; Y10T 29/49908; Y10T 29/49826; Y10T 403/648; Y10T 403/709
See application file for complete search history.

(56) References Cited

FOREIGN PATENT DOCUMENTS

| | | | |
|---|---|---|---|
| DE | 102012206678 | A1 | 11/2012 |
| WO | 2012152245 | A1 | 11/2012 |

\* cited by examiner

METHOD AND DEVICE FOR PRODUCING A CLINCH-RIVET CONNECTION BY MEANS OF A ROTARY OSCILLATING MOVEMENT

FIELD

A method and a device for producing a clinch-rivet connection using a rotary oscillating movement for connecting two metal components is provided.

BACKGROUND

An object such as this has become known from DE 10 2011 011 438 A1 filed by the same applicant. The disclosure content of this publication is to be incorporated into the disclosure content of the current invention in its entirety.

In the aforementioned publication, a clinch-rivet connection is produced on a metal component with the aid of an oscillating movement. The metal component is comprised of a pot-shaped lower part/workpiece that is connected to a plate-shaped upper part such that arced webs arranged around the periphery are molded onto the pot-shaped lower part, which engage in associated arc slots in the plate-shaped upper part, there to be reshaped in the sense of a widening applying the clinch-rivet method and using forming rollers. This results in a force-fit and form-fit abutment of the reshaped arc webs in the arc slots.

Accordingly, the non-deformed arc webs reaching through the arc slots of the lower part are brought into a cold flow state under the pressing force of forming rollers, and are thus expanded such that they rest in a force-fit and form-fit manner against the side walls of the arc slots in the plate-shaped upper part. In this way, the aforementioned clinch-rivet connection is produced.

However, the disadvantage of the known method is that a rotary oscillating movement has to be introduced onto the forming tool. The forming tool according to said publication is essentially a roller retainer, in which several forming rollers arranged around the periphery are present. The forming tool is rotatably driven by a driving tool carrying out an oscillating movement. With the known method, it is necessary that the pressing force onto the forming rollers needed for the deformation is also applied to the forming tool at the same time, thus using the forming tool for the production of the clinch-rivet connection by simultaneously applying an oscillating movement and a pressing force.

Another disadvantage of the known clinch-rivet method is that the adjustment of the oscillating movement is severely restricted because the oscillating movement is generated by means of a crank drive requiring a specific amplitude and a specific angle of rotation, which essentially cannot be changed.

The method for producing a clinch-rivet connection using a rotary oscillating movement for connecting two metal components is based on the subject matter of DE 10 2012 206 678 A1.

This publication already discloses a plug connector for connecting, in a rotationally engaged manner, a first component to a second component, in particular in a clutch unit, wherein the first component is provided with at least one connecting element configured as an arc web, which extends through a slot-shaped opening in the second component. The arc web of the first component extending through the slot of the second component is connected to the second component by way of a roll-forming method.

For this purpose, it is provided that the first and second component are arranged on a feed unit that is rotationally driven in an oscillating manner and at the same time is movable in an axial direction, which is able to firmly press the plugged-together components against cylindrical forming rollers fixedly arranged in a holder.

Accordingly, the cylindrical forming rollers roll in an oscillating manner clockwise and counter-clockwise across an angle range of, for example, 90 or 180 degrees relative to the circumferential direction of the rolling device so that each arc web is rolled over the rotatably mounted, cylindrical forming rollers several times, and a flow-pressing pressure is applied to the arc webs by the forming roller configured as a cylindrical roller so that piece by piece, the arc webs are pressed down and broadened, and thus a roll-formed connection between the first and the second component takes place.

The pressing down of the are webs can be in the range of a few mm. The feed of the cylindrical forming roller in Z-direction can be approximately $1/10$ mm per rotation.

Accordingly, the cylindrical rollers are rolled many times over the respective arc web, for example, ten times or some hundred times, so that it broadens in a mushroom shape, and with its lateral surfaces rests on the edges delimiting the recess in the second component.

However, the disadvantage of such a roll-forming method is that after being rolled over multiple times, the edges on both sides of the arc webs settle, enlarged outwardly in a mushroom shape, on the upper side in the edge region of the recess of the second component, where they partially break or splinter. Thus, an uncontrolled deformation of the arc webs results, which poses the risk that due to the mushroom-shaped expansion of the arc webs beyond the edges of the recess in the second component, invisible fracture lines and undesired crystalline deformations in the structure of the arc webs are formed, which impair the stability of the roll-forming connection.

Thus, a roll-formed connection such as this can also not be examined for a crack-free quality by way of an x-ray or ultrasound examination.

Accordingly, the arc webs are steamrolled, so-to-speak. The price to be paid is the disadvantage of fracture lines in the area of the roller-formed cross sections of the web arcs.

SUMMARY

It is therefore the object of the invention to further develop a method for producing a clinch-rivet connection and a device used therefor such that with substantially higher precision and more favorable process parameters, the clinch-rivet connection between a pot-shaped lower part and a plate-shaped upper part can be produced.

To meet this objective, a method is providing for producing a clinch-rivet connection using a rotary oscillating movement for connecting two metal components, wherein by means of forming rollers and the oscillating movement thereof, a vertical, and simultaneously a horizontal deformation is carried out, wherein one of the components has a preformed, flat, tab-like arc web, and the second component is provided with an arc slot, which allows the accommodation of the preformed, flat, tab-like arc web, and by radial oscillating movement, the forming roller presses the arc web into the arced slot by superimposed axial and rotary movement, thus producing a form-fit connection of the two components, wherein the outer circumference of the forming rollers is provided with a wedge-shaped profile, and that the oscillating movement of each forming roller with a specific pendulum path across the arc web does not exceed the length of the arc web.

In contrast to the rough rolling-over of the flat, tab-like arc webs of DE 10 2012 206 678 A1, the invention provides that instead of the roller-shaped or cylindrical forming rollers, the forming rollers now used are provided with an acute-angled profile, and that the oscillating movement of each forming roller with a specific pendulum path does not extend beyond the length of the arc web.

This means that the length of the arc web in the center area thereof is only partially rolled over by a profiled forming roller, and that the forming roller does not roll beyond the length of the arc web, and that the oscillating movement of the forming roller always remains within the area of the arc web.

Accordingly, the arc web does not get travelled over and rolled flat expanding into a mushroom shape, but instead, as a result of an acute-angled profiled forming roller, it is pressed apart in a wedge shape in its center area towards the sides, and with its edge-side cross sections deformed during the flow-forming process, comes to rest at the inner side of the recess in the other component.

The term "acute-angled" profiled forming roller is to be understood as any symmetrical wedge profile on the outer periphery of the forming roller that is able to displace the metal material from the center region of the arc web towards the outside—to the edge regions of the arc webs. Consequently, such a symmetric wedge profile can have any angle that is smaller than 180 degrees. Wedge profiles ranging from 160 to 30 degrees are preferred. Particularly preferred are wedge profiles ranging from 40 to 60 degrees. Instead of the term "acute-angled", the term "wedge-shaped" is also used.

However, in the scope of the invention, both forming rollers mounted on axes and forming rollers not mounted on axes are claimed as being essential to the invention. Forming rollers of the type not mounted on an axis are seated in bed made of ceramics, for example. The shaftless forming roller rotates in the fixed bed of ceramic material, and only protrudes from the bed with its wedge-shaped profiled periphery in order to impact the arc web with this freestanding periphery in the sense of a flow forming procedure.

The reshaped arc webs are not to protrude beyond the surface of the other component because otherwise, cross sections of the arc webs at risk for breaking and splintering could break off.

Rather, the invention provides that these arc webs deformed into wedge shape in the face area during the flow-forming process only rest against the inner side of the recess, that is, in the arc slot of the second component.

Due to the fact that it is avoided that the cross sections of the reshaped arc webs settle externally and above the surface of the V-shaped arc slot in the other component, no splintering can occur there anymore, and no invisible and no non-verifiable fracture lines develop.

Further characteristics of the invention are the subject matter of the remaining dependent claims.

It is beneficial for the oscillating movement to be introduced to the workpiece, and that the roller head with the forming rollers arranged there merely generates the pressing force onto the forming rollers, and thus onto the arc webs of the lower part to be reshaped.

It is further preferred that the oscillating movement and the application of a pendulum force as well as the generation of the pressure force take place in two components of the device separated from one another. Preferably, the pendulum force is applied to the workpiece arranged in the lower part of the device, which has the advantage that the workpiece can be driven in an oscillating manner with very little expenditure, whereas this is much more difficult with the roller head and the upper part of the device.

It is therefore provided in a preferred embodiment of the invention that the pendulum force is introduced to the workpiece by way of a clamping device, which receives the workpiece in a form-fit and force-fit manner. Part of the clamping device is a centering device having follower jaws. Each of the follower jaws has a form-fit contour profile, which is in engagement with a counter-contour on the workpiece directed radially outwards so that due to the contour engagement of the clamping tool with the workpiece, it is very easy to apply a pendulum force to the clamping tool.

In a preferred embodiment of the invention, it is provided that the centering device is mounted with the clamping tool on a rotary plate, which is provided with an outwardly directed toothed drive ring, which meshes with an associated drive gear wheel of a gear motor.

With such an arrangement, the oscillating movement can be modified within broad limits because the gear motor carries out an oscillating movement, which can be freely adjusted (programmable) with respect to its length and/or amplitude. In theory, an oscillating movement can be adjusted to an angle of rotation of 0 to 360 degrees, which was not possible with the crank device of the prior art.

An additional advantage of the invention is that an easily controllable drive, for example, hydraulic or ball roller spindle, acts on the roller retainer that accommodates the forming rollers for the deformation of the arc webs of the workpiece, which can be precisely adjusted with respect to its pressure force. Accordingly, the pressure force and the pressure path of such a drive can be precisely adjusted by way of very simple adjusting means, which results in a simplification and an improvement of the precision of the inventive device.

It was only known from the prior art device (DE 10 2011 011 438 A1) to press on the roller retainer by means of a hydraulic cylinder, which made it possible to adjust the pressure force but not, however, the pressure path.

The present invention picks up from here, using a so-called rollable drive, wherein both the pressure path and the pressure force can be finely adjusted, and as a consequence, a substantially better precision of the method and the device are achieved.

The important factor of the invention is that a defined modification of the pendulum force in Z direction (which is the rotational force with which the pendulum device is driven) is coordinated with the pressing force in X direction.

It has been found that the pendulum force in Z direction has to be relative low at the start of the oscillating movement and then accelerates sharply, wherein the maximal force is generated during the flow pressing in Z direction, and that shortly before reaching the end of the arc web, the pendulum force declines again so that not to deform the end of the arc web as much as, comparatively, the center area of the arc web.

This pendulum force is controlled by way of the angle of rotation. This has not been known from the state of the art.

The same goes for generating the pressing force in X direction, which acts from the roller head onto the forming rollers because here as well, starting out with a relatively low pressing force in an equilibrium position, the forming force accelerates very fast in X direction due to the fact that first, the forming roller is pressed into the material of the arc web, and then, during the oscillating movement, the pressure force remains relatively even, and prior to the end of the oscillating movement, the pressure force declines again and ends at a low value.

The benefits and characteristics of the invention are summarized in the compilation therebelow:

1. Clinch-rivet connection of at least two metal components, wherein by means of a rotary oscillating movement by forming rollers, a vertical and simultaneously a horizontal deformation (3-axis stress state/material flow) is carried out.
2. Clinch-rivet connection of at least two metal components, wherein one of the components has pre-formed, flat tab-like material formation, and the second component is provided with a partially V-shaped opening, which allows the accommodation of the preformed, flat tab-like material formation, wherein at an angle of at least 10 degrees, a forming roller stamps the material formation into the V-shaped opening via radial oscillating movement by means of superimposed axial movement, thus producing a form-fit connection of the two components.
3. Clinch-rivet connection of at least two metal components, wherein one of the components has a preformed, annular material embossing, and the second component is provided with a receiving contour on a wave contour arranged in the larger diameter, which allows the accommodation of the preformed, annular material embossing, wherein at an angle of at least 10 degrees, a forming roller stamps the material embossing into the receiving contour via radial oscillating movement by means of superimposed axial movement, thus producing a form-fit connection of the two components.
4. Clinch-rivet connection of at least two metal components, wherein one of the two components has a V-shaped opening for receiving the other part for the connecting process.
5. Clinch-rivet connection of at least two metal components, wherein with a wave connection, one of the two components is provided with a toothing or corrugated contour, into which the preformed material is rolled and thus, a surface-wise larger and therefore more-torque-proof positive fit results.
6. Clinch-rivet connection of at least two metal components, wherein the rotary oscillating movement of the roller retainer with a defined degree value also corresponds to the radial forming path—in degrees as seen from the center of rotation—in the riveting process of the components.
7. Clinch-rivet connection of at least two metal components, wherein the roller retainer accommodates at least one forming roller.
8. Clinch-rivet connection of at least two metal components, wherein the roller retainer accommodates at least one forming roller and they differ with respect to their contours.
9. Clinch-rivet connection of at least two metal components, wherein with respect to the degree of deformation, the method follows a mathematical function, which is explained in more detail in the description of the drawings section.
10. Device for a clinch-rivet connection for at least two metal components, wherein mechanically, hydraulically, or by way of servomotor, a rotary, radial oscillating movement of a roller retainer with forming rollers having an adjustable degree value and a simultaneously adjustable axial movement by means of mechanical, hydraulic, or servomotor components is carried out.
11. Device for a clinch-rivet connection for at least two metal components, wherein in a rotary radial oscillating movement around the axis 1, and simultaneously an axial one along the axis 1, forces and torques for the deformation for the clinch-rivet process are transmitted. Can be adjusted and regulated.
12. Device for a clinch-rivet connection for at least two metal components, wherein from the combination of a radial and an axial application of force onto the components to be connected by means of forming rollers, a flow of the metal material of the components takes place.
13. Device for a clinch-rivet connection for at least two metal components, wherein during the process, the two movements and main axes can be measured and regulated with respect to path, force, and torque.
14. Device for a clinch-rivet connection for at least two metal components, wherein during the process, the two movements and main axes can be measured, and regulated accordingly, with respect to path, force, and torque. This is about a closed forming process that can be monitored, wherein the horizontal and vertical forming path as well as the rotational torque of the rotary movement are electronically synchronized with one another, measured and adjusted. The rotational torque is generated by the active forming rollers inside the roller retainer by way of the actual displacement of material.

The scope of the present invention is not limited to the subject matter of the individual patent claims but is a combination of all the individual patent claims of the invention.

All specifications and characteristics, including the abstract, disclosed in the documents, particularly the dimensional configuration illustrated in the drawings, are claimed as essential features of the invention so far as, individually or in combination, they are novel with respect to the state of the art.

BRIEF DESCRIPTION OF THE DRAWINGS

The present invention is described in more detail therebelow with reference to drawings illustrating one embodiment only. From the drawings and the description thereof, further essential inventive features and advantages of the invention will become apparent.

It is shown in.

DETAILED DESCRIPTION

Figure 1:
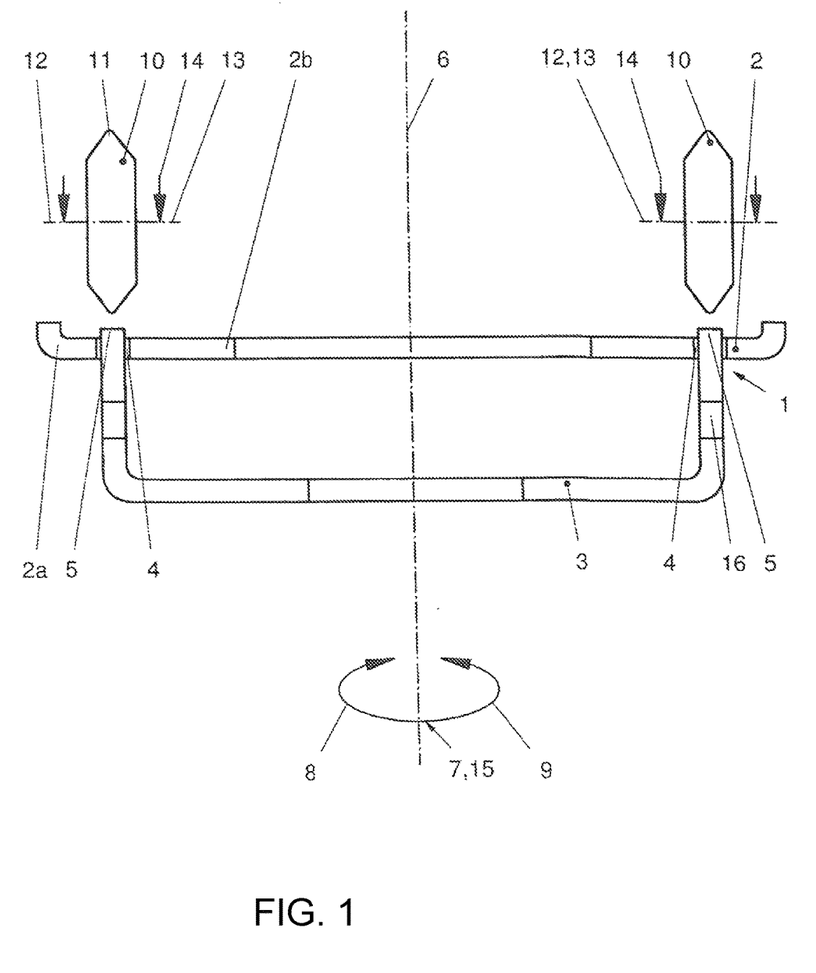
FIG. 1: Schematized in side view, a clinch-rivet deformation between a pot-shaped lower part of a workpiece, which with arc webs reaches through arc slots of an approximately plate-shaped upper part.

In FIG. 1, a workpiece 1 in general is illustrated, which essentially is comprised of an upper part 2, which is to be connected to a lower part 3 by means of several clinch-rivet connections that are arranged evenly spaced around the periphery. The upper part 2 is essentially composed of an approximately pot-shaped plate part 2*b* provided with an edge 2*a* that is directed obliquely outwards.

The lower part 3 is essentially configured in a pot shape, and is provided with a central recess arranged at the bottom, as well as one, or a plurality, of recesses 16 that are evenly arranged around the periphery and are directed radially outwards.

The vertically upwardly directed walls of the pot-shaped lower part 3 are configured as arc webs 5, which extend at a specific angle of 30 degrees as arc webs 5 through associated arc slots 4 in the region of the plate part 2*b* of the upper part 2.

In the undeformed state, the arc webs 5 extend approximately 0.5 mm beyond the upper side of the plate part 2*b* of the upper part 2.

The clinch-rivet connection illustrated in FIG. 1 schematically only is produced such that with the aid of forming rollers 10 dedicated to each arc web 4, which are arranged evenly distributed around the periphery of a roller retainer 12, a flow-pressing force is applied to the upper side of the arc web 5 of the lower part 3. As a result, the arc webs 5 are deformed radially inwards and outwards, and come to rest form-fittingly and force-fittingly on the side walls of the arc slot 4 in the upper part 2.

For this purpose, a suitable pressing force 14 is applied to each of the forming rollers 10 so that with its roller head 11, which is approximately cone-shaped, each forming roller 10 is pressed with the same pressing force against the face side of the arc web 5.

For a device, the invention provides that the workpiece 1 is form-fittingly and force-fittingly held in a clamping tool 17 to be described in more detail later on, and in its rotational axis 6, will be subjected to an oscillating movement 7 in the direction of arrows 8, 9, wherein the oscillating movement 7 is carried out with a specific rotary pendulum force 15.

Furthermore, each forming roller 10 is rotationally mounted in the dedicated roller retainer 12, wherein the forming rollers 10 are not rotatably driven. Accordingly, they are only rotatably mounted but not rotatably driven.

Figure 2:
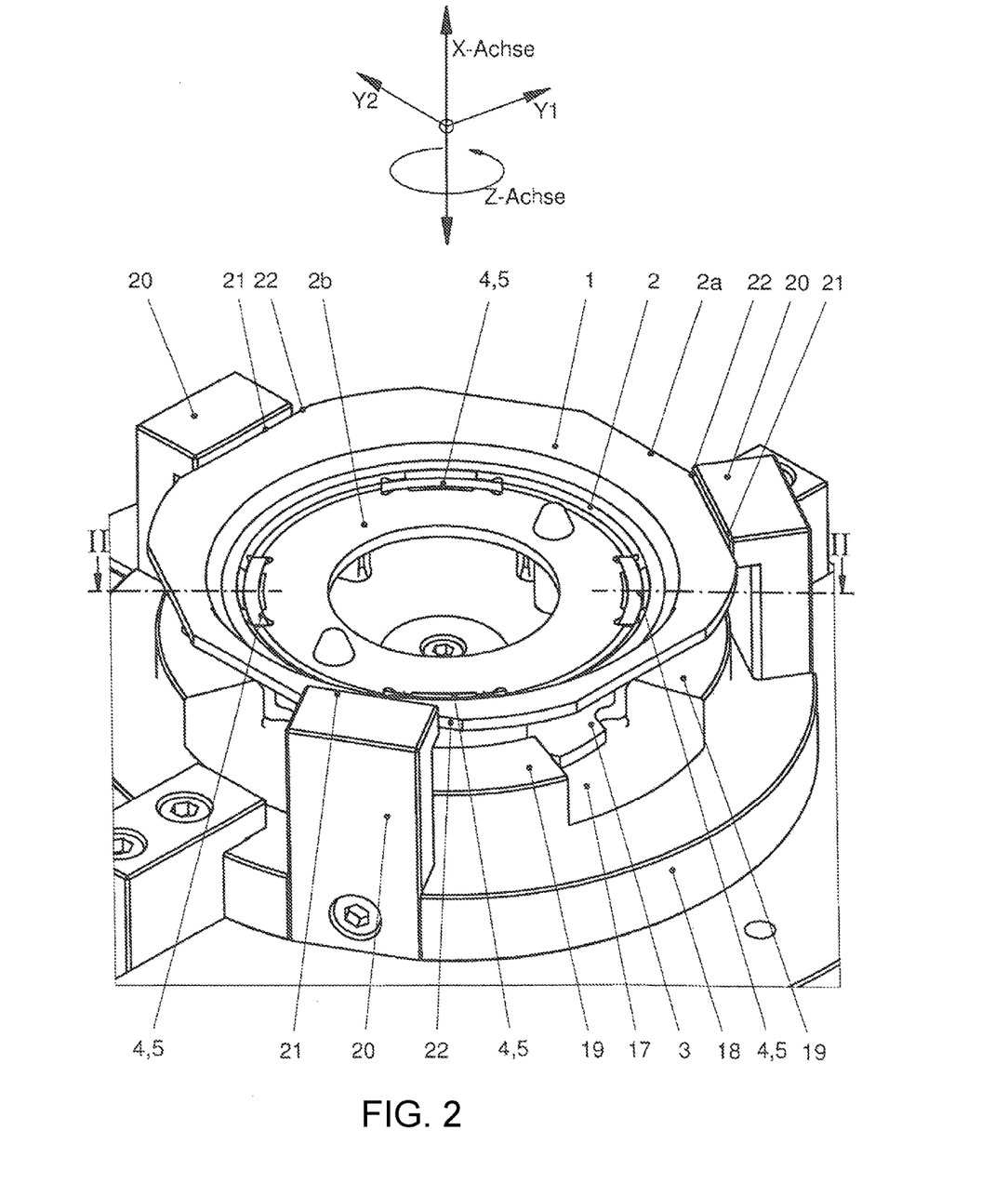
FIG. 2: The perspective view of the workpiece of FIG. 1, with illustration of the clamping tool.

FIG. 2 shows further details of the clamping of the workpiece 1 in an associated clamping tool 17. The clamping tool 17 essentially comprises a centering disk 18, on which a number of follower jaws 20 are arranged evenly distributed around the periphery. Each follower jaws 20 is provided with a contour 21 that is directed radially inwards, which is in form-fitting engagement with a dedicated contour arranged on the upper part 2 in the region of the edge 2*a* of the workpiece 1.

In this way, the workpiece 1 is retained in the clamping tool 17 free of play and in a form-locked manner.

Furthermore, the lower part 3 of the workpiece 1 is further held and centered by clamping jaws 19, which rest form-fittingly against the outer wall of the lower part 3.

Figure 3:
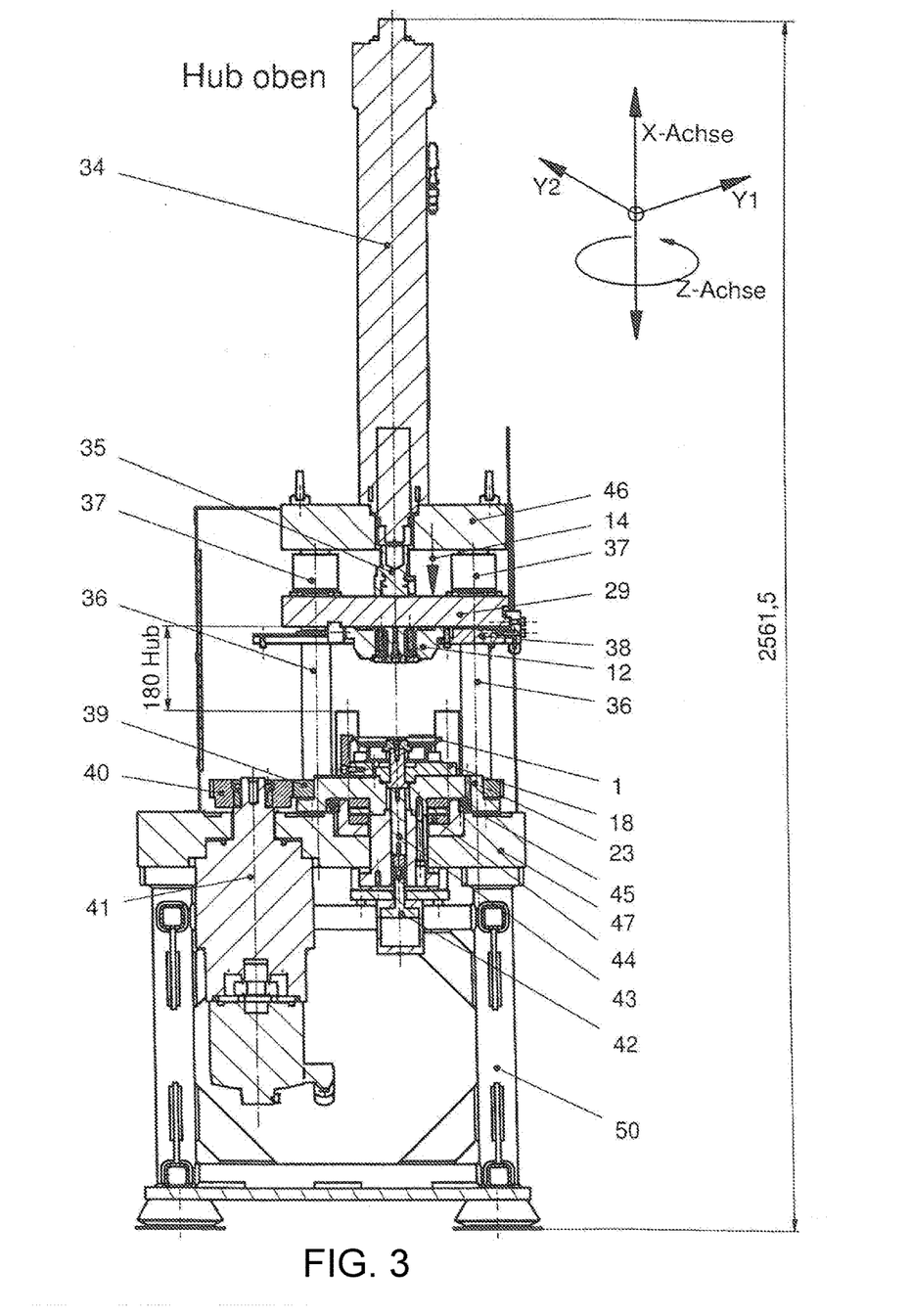
FIG. 3: Cross-sectional view of the device in an open state.

According to FIG. 3, the centering disk 18 is seated on the upper side of a rotary plate 23, which with its outer periphery is connected to a toothed ring 39, the outwardly directed toothing of which is in toothing engagement with a dedicated drive gear wheel 40, wherein the drive gear wheel 40 is connected to the drive shaft of a gear motor 41 in a rotationally fixed manner. The gear motor 41 carries out the oscillating movement 7 in the direction of arrows 8, 9 on the rotary plate 23. Since it is configured as a gear motor 41, it can generate the pendulum force 15 with a high rotary torque over a freely adjustable angular distance.

The upper part of the device essentially consists of a ball roller spindle 34, which, according to the further parts in FIG. 3, is mounted on a head plate 46, and which acts upon the upper side of a plunger plate 29 by way of a pressure ram 35.

The plunger plate is displaceably mounted, in the manner of a lifting frame, in the fixed columns 36 with the aid of guide bushings 37. The guide columns 36 are fastened in the head plate 46. On the lower side of the plunger plate 29, the roller retainer 12 is arranged, in which the forming rollers 10 are arranged evenly distributed around the periphery.

In the lower part of the device, a pneumatic cylinder 42 is arranged, the piston rod of which drives a lifting bolt 43 that can be lifted and lowered, which in the manner of an ejector lifts the component from the centering device, as will be explained later on with reference to FIG. 5.

It can be learned from FIG. 3 that with the aid of radial bearings 45 and an axial bearing 44 arranged around the periphery, the rotary plate 23 is rotatably mounted in the lower part of the device.

Incidentally, the lower part of the device is held in a base frame 50 positioned on the bottom.

Figure 4:
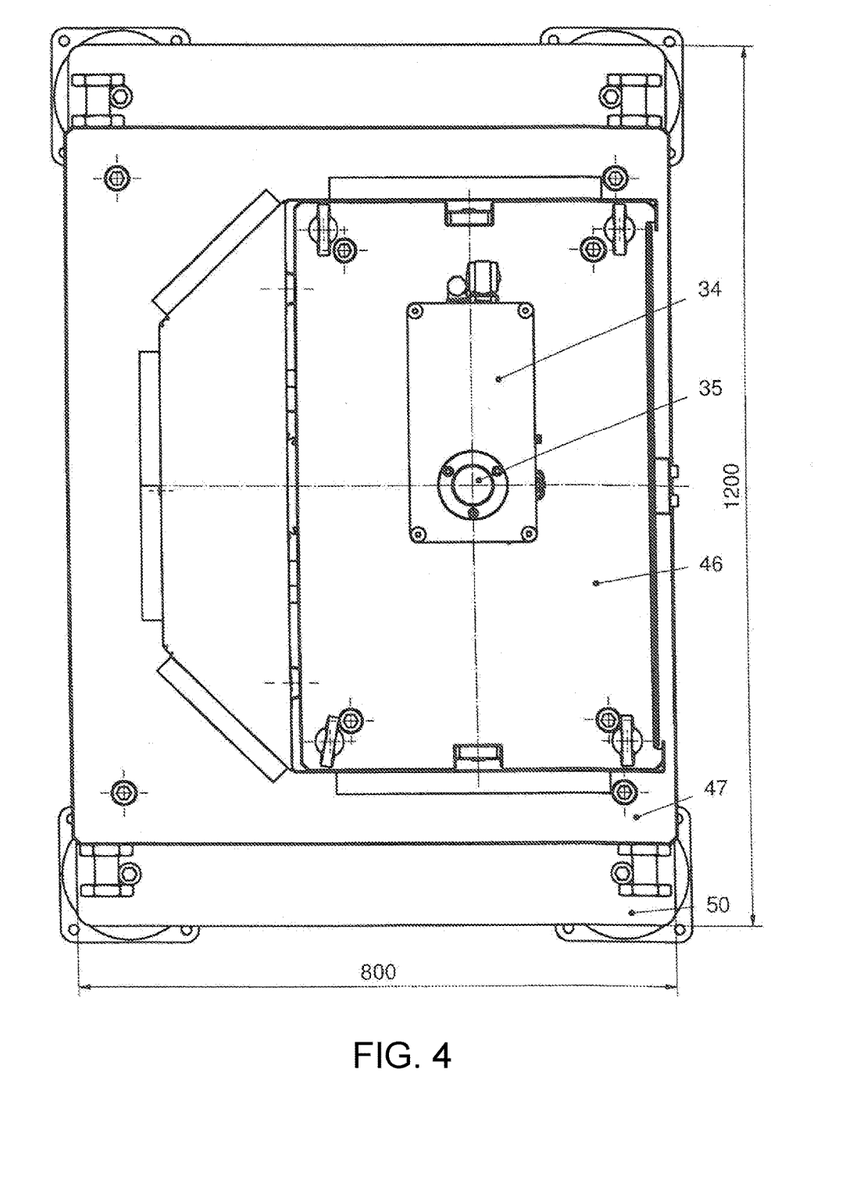
FIG. 4: Top view of the device of FIG. 3.

The roller retainer 12 is held in a holding plate 38 in the upper part. FIG. 4 shows the top view of the device, where the same parts in FIG. 3 are identified with the same reference numerals. It can be seen here that the ball roller spindle 34 is arranged above a head plate 46, and that the head plate 46 is arranged above a base plate 47 of a larger size.

Figure 5:
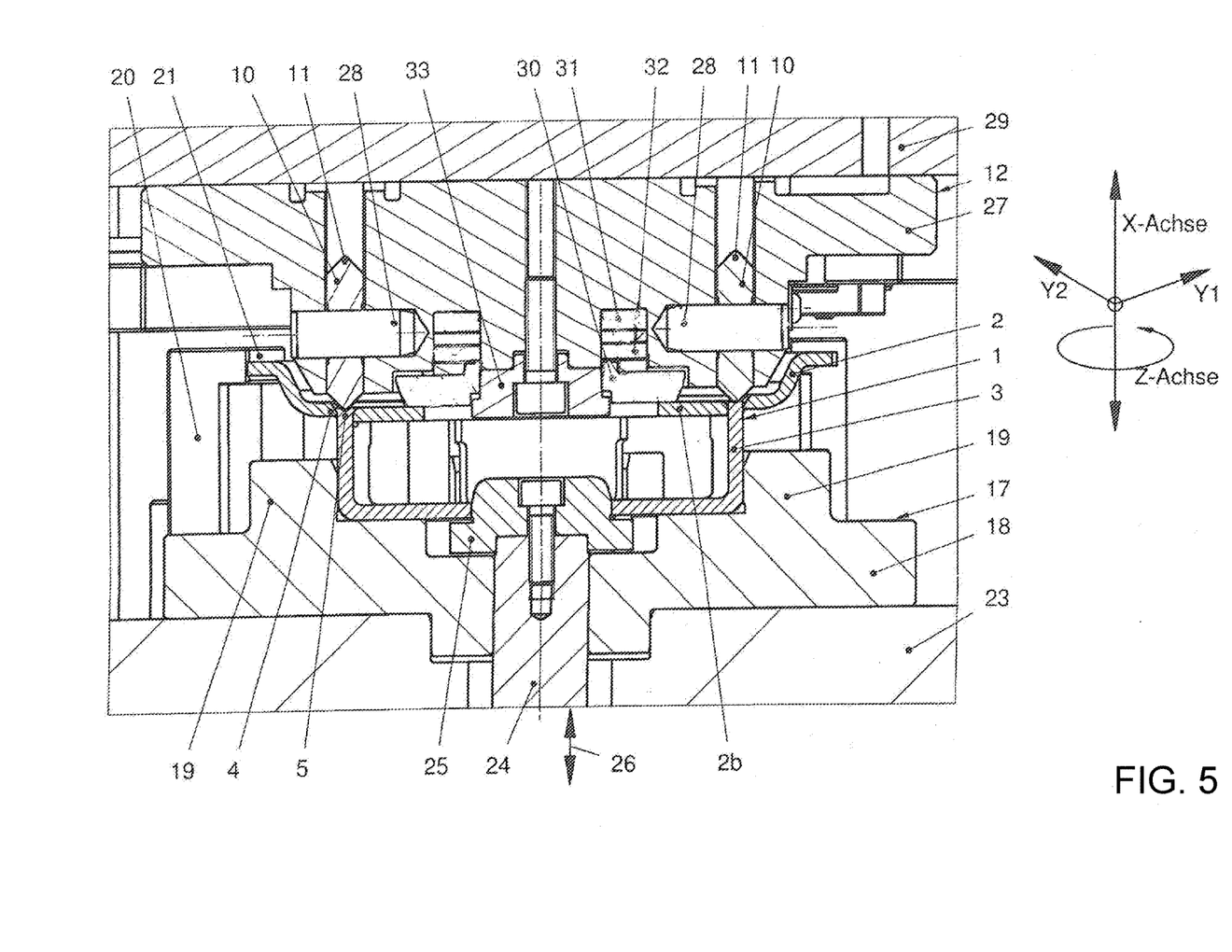
FIG. 5: Enlarged cross section of the workpiece and the forming rollers.

From FIG. 5, the further details of the forming part of the device can be discerned.

In the lower part, the centering bolt 24 is connected to the lifting bolt 43 of FIG. 3, and the upper side of the centering bolt 24 is connected to a centering disk 25, which form-fittingly engages with the central receptacle of the lower part 3, centering the lower part.

The centering bolt 24 is liftably and lowerably actuated via the lifting drive of the pneumatic cylinder 42 in the direction of arrow 26 in order to lift the workpiece 1 from the lower part when the upper part is open (see FIG. 3).

In the upper part of the device, the roller retainer 12 is formed by a plate body 27, which is provided with several slot-shaped receptacles for receiving several forming rollers 10 arranged evenly distributed around the periphery. Each forming roller 10 is rotatably mounted on a bearing bolt 28.

For centering the upper part 2 of the workpiece 1, it is provided that in the center area of the plate body 27, a holding disk 33, with the aid of a threaded screw, engages with the upper central recess in the plate part 2*b* of the workpiece 1, where a resilient retaining force is generated such that a pressure disk 30 presses onto the upper side of the plate part 2*b* of the workpiece 1, which with the aid of plate springs 31 arranged around the periphery generates a resilient pressing force onto the pressure disk 30.

The pressure disk 30 is rotatably mounted to the fixed holding disk 33 by way of a thrust bearing 32.

In this way, the rotary oscillating movement, which is introduced onto the lower part 3 of the workpiece 1, can be transmitted onto the pressing disk 30, which is thus rotatably mounted with respect to the fixed roller retainer 12.

Figure 6:
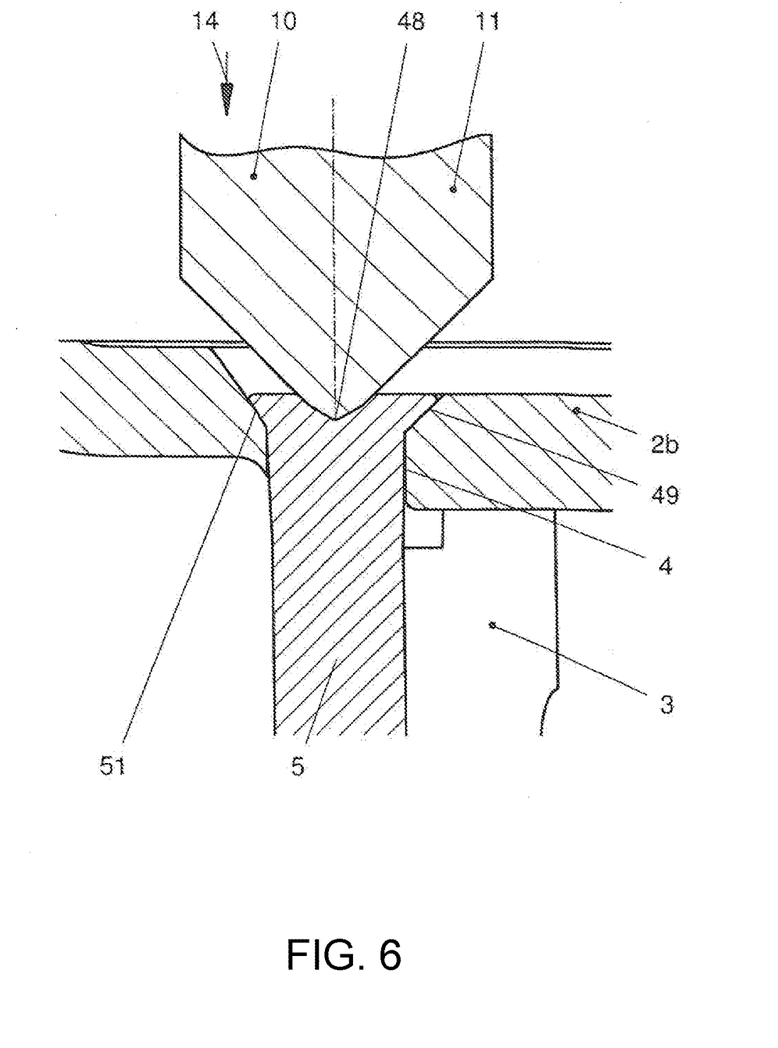
FIG. 6: A schematized cross-sectional view, greatly enlarged, of the roller head of a forming roller during the deformation of the arc web into the arc slot.

In FIG. 6, the clinch-rivet process is shown in a greatly enlarged illustration. It can be discerned that the roller head 11 of each forming roller has an approximately cone-shaped contour 48. The exact shaping of the contour 48 depends on the material of the arc web 5 of the lower part 3 as well as on the pressing force 14 and the pendulum force 15. In addition, the forming process depends on the requirements as to the stability of the clinch-rivet connection, which is done by way of a cold-flow process of the arc web 5, which in the manner of a forming bead 49 is radially (according to FIG. 6) displaced on both sides of the roller head 11, pressing itself into a dedicated cone-shaped chamfer 51 in the area of the arc slot 4.

Figure 7:
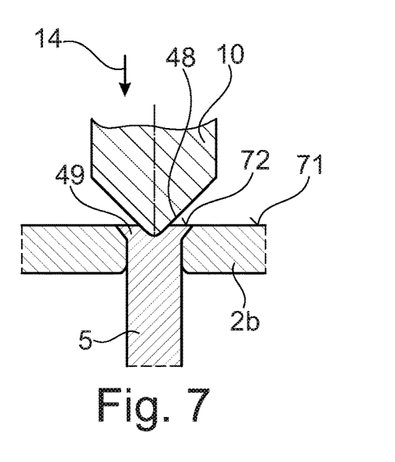
FIG. 7: Schematized, the roller deformation process in the manner of the drawing in FIG. 6.

FIG. 7 shows the same parts as are shown in FIG. 6. It can be discerned from FIG. 7, that with its surface 72, the forming bead 49 produced with the roll-forming method is in the head area of the arc web 5 nearly flush with the surface 71 of the adjacent component 2b.

It can further be seen that the acute-angled contour 48 of the forming rollers 10 buries itself approximately in the center area of the arc web 5, and in a flow-pressing process displaces the metal material arranged in the end face region of the arc web 5 to the approximately cone-shaped, chamfered (chamfer 51 as in FIG. 6) receptacle in plate part 2b.

Figure 8:
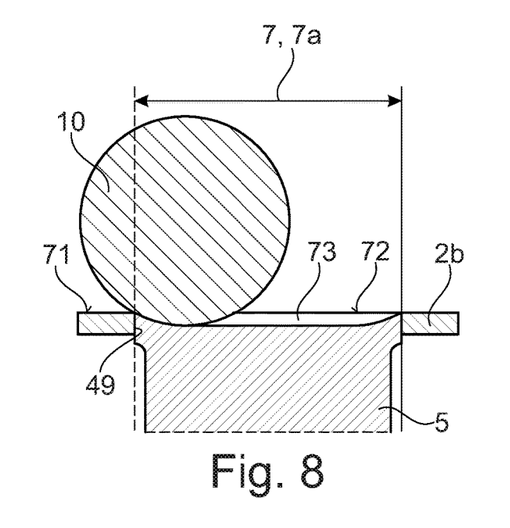
FIG. 8: The side view of the illustration in FIG. 7.

It can be seen in FIG. 8 that the acute-angled contour 48 of the forming roller 10 moves along a recessed forming surface 73 across the length of the arc web 5 so that a forming surface 73 that is recessed in the center region of the arc web 5 is formed, which inclines towards its sides, thus forming a surface 72 that is flush with the adjacent surface 71 of the adjacent component 2b.

Figure 9:
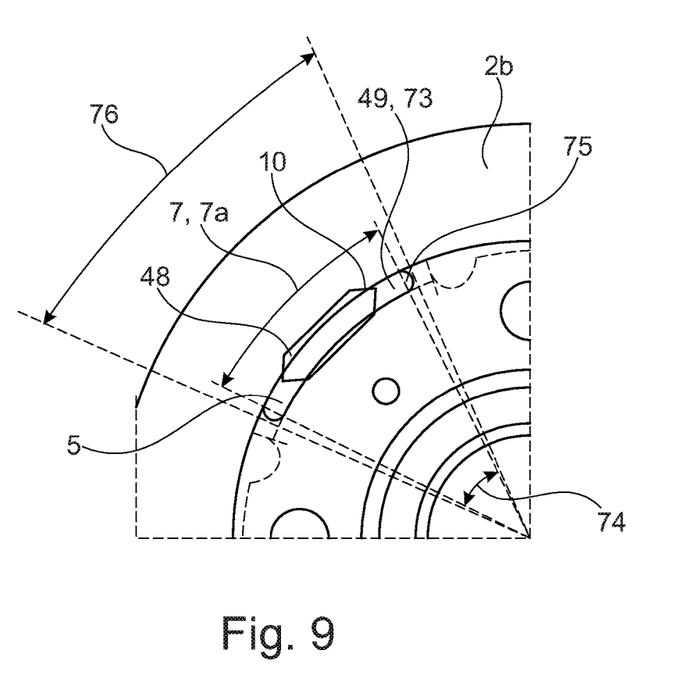
FIG. 9: The top view of the array according to FIG. 8.

FIG. 9 illustrates the path 7a of the oscillating movement 7 of the forming rollers 10, and the length 76 of the arc web 5 is indicated at the same time.

This makes it clear that the length 76 of the arc web 5 is longer than the pendulum path 7a because residual paths 75 remain to the left and to the right.

Thus, the angular range 74 covered by the pendulum path 7a is smaller than the actual angular extent of the arc web 5.

LIST OF REFERENCE NUMERALS 1 workpiece
2 upper part
2a plate part
2b edge
3 lower part
4 arc slot
5 arc web
6 rotational axis
7 oscillating movement
7a pendulum path
8 direction of arrow
9 direction of arrow
10 forming roller
11 roller head
12 roller retainer
13 rotational axis
14 pressing force
15 pendulum force
16 recess
17 clamping tool
18 centering disk
19 clamping jaw (below)
20 follower jaw (above)
21 contour
22 outer contour (of 1)
23 rotary plate
24 centering bolt
25 centering disk
26 direction of arrow
27 plate body
28 bearing bolt
29 plunger plate
30 pressure disk
31 plate spring
32 thrust bearing
33 holding disk
34 ball roller spindle
35 pressure ram
36 fixed columns; guide columns
37 guide bushing
38 holding plate
39 toothed ring
40 drive gear wheel
41 gear motor
42 pneumatic cylinder
43 lifting bolt
44 thrust bearing (for 23)
45 radial bearing (for 23)
46 head plate
47 base plate
48 contour
49 forming bead
50 base frame
51 chamfer
52 position
53 pendulum force (onto forming roller 10)
54 pendulum force (onto centering device 18)
55 pendulum force (onto workpiece 1)
56 position
57 position
58 position
59 position
60 position
61 N/A
62 N/A
63 pressing force (onto forming roller 10)
64 pressing force (onto 18)
65 pressing force (onto 1)
66 position
67 position
68 position
69 position
70 position
71 surface (of 2b)
72 surface (of 49)
73 forming surface
74 angular range
75 residual path
76 length of 5 (arc web)

The invention claimed is:

1. A method for producing a clinch-rivet connection using a rotary oscillating movement for connecting a first and a second metal component of a workpiece, comprising:
securely holding the workpiece in a clamping tool,
rotationally moving the clamping tool by driving the clamping tool in the rotary oscillating movement with a given pendulum force by a programmable motor, thereby causing an oscillating movement of the clamping tool with respect to forming rollers connected so as to be moved into pressing contact with the workpiece to simultaneously vertically and horizontally deform the first metal component, wherein the first metal component has preformed, flat, tab-like arc webs, and the second component is provided with arc slots that are each configured to receive one of the preformed, flat, tab-like arc webs, and wherein by movement of the forming rollers in an axial direction simultaneously with the rotary oscillating movement of the clamping tool, the forming rollers press each of the preformed, flat, tab-like arc webs into the arc slots by simultaneous oscillating movement of the workpiece and movement of the forming rollers in the axial direction toward the workpiece, thus producing the clinch-rivet connection of the first and the second metal components, wherein an outer circumference of the forming rollers is provided with a wedge-shaped profile, and wherein the oscillating movement of each of the forming rollers with a specific pendulum path across each of the preformed, flat, tab-like arc webs does not exceed a length of each of the preformed, flat, tab-like arc webs.

2. The method according to claim 1, wherein a surface of each the preformed, flat, tab-like arc webs forms a forming bead, which as seen across the length of each of the preformed, flat, tab-like arc webs, respectively, is recessed at least in a center area of the length of each of the preformed, flat, tab-like arc webs, and which is located below a surface of an adjacent component.

3. The method according to claim 2,
wherein the surface of the preformed, flat, tab-like reshaped arc webs inclines towards sides of the preformed, flat, tab-like reshaped arc webs connecting with the adjacent component in a peripheral direction so as to be flush with an adjacent surface of the adjacent component.

4. The method according to claim 1, regulating and controlling a resulting 3-axis stress state that is present during the forming of the clinch-rivet connection independently from one another by movements in Z and X directions.

5. The method according to claim 4, further comprising, within a framework of an open-loop and closed-loop indicator, adjusting said movements in the X direction and the Z direction with respect to a force and torques based on programmed specifications of the programmable motor, at least via a path X.

6. The method according to claim 1, wherein the rotary oscillating movement of the clamping tool carried out by the programmable motor that can be controlled with respect to its length and/or amplitude, the rotary oscillating movement is transferred to the workpiece by a connection of the programmable motor to a driver gear wheel which meshes with an associated outwardly directed toothed drive ring connected to a rotary table, wherein in an upper side of the rotary table, a centering disk is seated on which the workpiece is positioned, the centering disk being part of the clamping tool, the clamping tool further having follower jaws that engage the workpiece, wherein the clamping tool receives the workpiece in a form-fit and force-fit manner by engaging directed radially outwards the follower jaws to a counter-contour of the workpiece.

7. The method according to claim 6, wherein the programmable motor acts on a roller retainer that accommodates the forming rollers for the vertically and horizontally deformation of the arc webs of the workpiece, wherein a pressing force of the forming rollers and a pendulum path of the clamping tool can be adjusted by an adjusting device connected to the programmable motor.

8. The method according to claim 1, wherein the pendulum path of each of the forming roller is approximately 80 to 95% of the length of each of the preformed, flat, tab-like arc webs.

9. The method according to claim 1, wherein the clamping tool receives the workpiece in a form-fit and force-fit manner.

10. The method according to claim 1, wherein a defined modification of the pendulum force in a Z-direction, which is a rotational force with which forming rollers are moved according to the rotary oscillating movement of the clamping tool, is combined with a pressing force in an X-direction to provide the vertically and horizontally deformation of the first metal component.

11. The method according to claim 1, wherein a rolling head is connected to the forming rollers, and a pressing force in an X-direction, which acts from the roller head onto the forming rollers, starting out with a low pressing force in an equilibrium position, accelerates quickly in the X-direction so that the forming rollers are initially pressed into the preformed, flat, tab-like arc webs, and thereafter, the pressing force remains steady in a regulated manner during the rotary oscillating movement of the clamping tool.

12. The method according to claim 1, further comprising deforming the preformed, flat, tab-like arc webs of the workpiece using a mechanical device comprising a ball roller spindle that acts on a roller retainer, which supports the forming rollers, wherein the roller retainer is adjustable with respect to its a pressing force and/or a pressure path.

13. A device for producing a clinch-rivet connection using a rotary oscillating movement for connecting a first and a second metal component of a workpiece, comprising
a clamping tool for securely holding the workpiece,
a programmable motor to rotationally drive the clamping tool in the rotary oscillating movement with a given pendulum force,
forming rollers connected so as to be moved into pressing contact with the workpiece to simultaneously carry out a vertical and a horizontal deformation of the first metal component,
wherein the first metal components has preformed, flat tab-like arc webs, and the second component is provided with arc slots that are each configured to receive one of the preformed, flat, tab-like arc webs, and
wherein the forming rollers are configured to move in an axial direction simultaneously with the rotary oscillating movement of the clamping tool, such that the forming rollers press each of the preformed, flat, tab-like arc webs into the slot by simultaneous oscillating movement of the workpiece with respect to the forming rollers and movement of the forming rollers in the axial direction toward the workpiece, thus producing the clinch-rivet connection of the first and the second metal components,
wherein an outer circumference of the forming rollers has an acute-angled profile, and
wherein the oscillating movement of each of the forming rollers with a specific pendulum path across the preformed, flat, tab-like arc webs does not exceed a length of each of the preformed, flat, tab-like arc webs.

14. The device according to claim 13, wherein the rotary oscillating movement of the clamping tool carried out by the programmable motor that can be controlled with respect to its length and/or amplitude, the rotary oscillating movement is transferred to the workpiece by a connection of the programmable motor to a driver gear wheel which meshes with an associated outwardly directed toothed drive ring connected to a rotary table, wherein in an upper side of the rotary table, a centering disk is seated on which the workpiece is positioned, the centering disk being part of the clamping tool, the clamping tool further having follower jaws that engage the workpiece, wherein the clamping tool receives the workpiece in a form-fit and force-fit manner by engaging directed radially outwards the follower jaws to a counter-contour of the workpiece.

15. The device according to claim 14, wherein the programmable motor acts on a roller retainer that accommodates the forming rollers for the vertically and horizontally deformation of the arc webs of the workpiece, wherein a pressing force of the forming rollers and a pendulum path of the clamping tool can be adjusted by an adjusting device connected to the programmable motor.

16. The device according to claim 13, wherein a resulting 3-axis stress state that is present during the production of the clinch-rivet connection is regulated and controlled independently from one another by way of movements in Z and X directions.

17. The device according to claim 16, wherein within a framework of an open-loop and closed-loop indicator, said movements in the X direction and the Z direction are adjusted with respect to a force and torques based on programmed specifications, at least via a path X.

18. The device according to claim 13, further comprising a mechanical device comprising a ball roller spindle acting on a roller retainer, which supports the forming rollers for the vertically and horizontally deformation of the preformed, flat, tab-like arc webs of the workpiece, wherein the ball roller spindle has an adjustable pressing force and/or pressure path.

* * * * *